United States Patent
Sæther

(10) Patent No.: US 6,874,275 B2
(45) Date of Patent: Apr. 5, 2005

(54) SYSTEM FOR AND METHOD OF BENEFITING THE GROWTH CONDITIONS FOR GRASS PLANTS THAT CONSTITUTE THE GRASS PITCH OF A SPORTS INSTALLATION, IN PARTICULAR A FOOTBALL PITCH

(75) Inventor: Kolbjørn Sæther, Stavanger (NO)

(73) Assignee: Mobilt Drivhus AS (NO)

( * ) Notice: Subject to any disclaimer, the term of this patent is extended or adjusted under 35 U.S.C. 154(b) by 0 days.

(21) Appl. No.: 10/257,619

(22) PCT Filed: Apr. 10, 2001

(86) PCT No.: PCT/NO01/00161

§ 371 (c)(1),
(2), (4) Date: Jan. 11, 2003

(87) PCT Pub. No.: WO01/78497

PCT Pub. Date: Oct. 25, 2001

(65) Prior Publication Data

US 2003/0140555 A1 Jul. 31, 2003

(30) Foreign Application Priority Data

Apr. 12, 2000 (NO) ............................................. 20001883

(51) Int. Cl.[7] ................................................. A01G 9/20
(52) U.S. Cl. ..................... 47/17; 362/58.1 LS; 362/403; 52/6
(58) Field of Search ............................... 47/17, 58.1 LS; 362/403, 122; 248/161, 157, 158; 52/6, 66; A01G 9/20

(56) References Cited

U.S. PATENT DOCUMENTS

| | | | | |
|---|---|---|---|---|
| 4,091,566 A | * | 5/1978 | Horvath et al. | 47/17 |
| 4,196,544 A | * | 4/1980 | Davis et al. | 47/17 |
| 4,352,259 A | * | 10/1982 | Smith et al. | 52/2.17 |
| 4,358,817 A | * | 11/1982 | Bielemeier | 362/386 |
| 6,202,356 B1 | * | 3/2001 | Hock | 52/6 |

FOREIGN PATENT DOCUMENTS

| | | | | |
|---|---|---|---|---|
| GB | 2350997 A | * | 12/2000 | A01G/9/20 |
| GB | 2372422 A | * | 8/2002 | A01G/9/20 |
| WO | 95/09681 | | 4/1995 | |
| WO | 00/57689 | | 10/2000 | |

* cited by examiner

Primary Examiner—Teri P. Luu
Assistant Examiner—Susan C. Alimenti
(74) Attorney, Agent, or Firm—Andrus, Sceales, Starke & Sawall, LLP

(57) ABSTRACT

An account is given of a system for and a method of making the growth/thriving conditions for grass more favorable in connection with grass pitches, e.g. football pitches. A lighting unit having a rectangular peripheral shape and thin, disc-like form is dimensioned to correspond to the pitch that is to be lit artificially, and may comprise extra devices for additional functions that may improve the growth/thriving of the grass, such as watering/ventilation. The lighting unit (16) is arranged to be moveable in the vertical direction by means of a hoisting arrangement comprising masts (10) (or stand roofs), wires (20) and powered hoisting apparatuses.

7 Claims, 4 Drawing Sheets

SYSTEM FOR AND METHOD OF BENEFITING THE GROWTH CONDITIONS FOR GRASS PLANTS THAT CONSTITUTE THE GRASS PITCH OF A SPORTS INSTALLATION, IN PARTICULAR A FOOTBALL PITCH

CROSS REFERENCE TO RELATED APPLICATION

The present application is the U.S. national stage application of International Application PCT/NO01/00161, filed Apr. 10, 2001, which international application was published on Oct. 25, 2001 as International Publication WO 01/78497. The International Application claims priority of Norwegian Patent Application 2001883, filed Apr. 10, 2001.

SUMMARY OF THE INVENTION

This invention regards a system or an arrangement for making the growth conditions for grass plants more favorable, which grass plants constitute the grass pitch of a sports installation, in particular a football pitch, especially where stands put the pitch or large areas of it in the shade.

The invention also regards a method that is based on the same application purpose, and which distinguishes itself by actions in the form of special steps in the method.

The system/arrangement and the method are primarily associated with grass on football pitches, however it should be obvious that similar grass pitches for practicing other sports represent technically equivalent grass pitches. As an example, indoor football pitches for which high quality, natural grass is desired basically have poor growth conditions, thus coming under the type of grass pitch where the growth/thriving conditions for the grass may be improved. On football pitches and in other sports installations where the main arena is comprised of a natural grass pitch, the so-called blanket of grass/turf, surrounded by tall, towering stands, often with a comprehensive superstructure, the above shady conditions, which are unfavorable to the growth of grass plants, are highly prominent. These conditions inhibit the growth of the grass, at least within the areas of shade, and generally make the growing conditions of the plants more unfavorable.

These unfavorable lighting conditions will inevitably lead to deterioration in the quality of the grass pitch. In addition to said shady conditions, shorter days will further contribute to a reduction in the quality of the pitch.

In Norwegian patent application No. 19991442 (not published), a system and a method are described, the aim of which is to make the growth/thriving conditions for plants that form part of grass pitches more favorable, the conditions of which grass pitches are affected adversely by among other things shade, wind and storms. This system distinguishes itself by comprising at least one traveling lighting unit that, in addition to light sources, may also include means of selective watering/aeration, lawn clean-up etc., so that the lighting unit exhibits the general features of a mobile greenhouse/hothouse. The lighting unit may generally have an effective longitudinal extent that corresponds to the width of the grass pitch and an extent in the longitudinal direction of the grass pitch that corresponds to a fraction of this longitude.

Thus above Norwegian patent application suggests a method by which a grass pitch of the football pitch type is first of all lit in an artificial manner by means of lamps/incandescent bulbs/fluorescent lamps, preferably known lamps etc. of the type for which a growth enhancing effect has already been ascertained. The lighting is preferably carried out periodically and by zones, in a manner such that a zone is a section with a width that corresponds to the width of the pitch and a length that corresponds to a fraction of the length of the pitch, and where the lighting is applied to each zone for a certain period, e.g. dependent on how many such zones the pitch has been divided into as a result of the stepwise movement of the carriage and the amount of time that is available for each lighting.

By this method, a low carriage of a large size and carrying said light sources is moved intermittently, with this artificial lighting of the grass pitch, possibly in connection with said introduction of water/air, forced ventilation, clean-up etc., being carried out as often and for as long as it takes to supply sufficient light energy etc. for the treatment to result in an improved quality of the grass pitch in question.

BRIEF DESCRIPTION OF THE INVENTION

The present invention is based on the solutions developed previously, and is thus generally based on the use of a lighting unit that is constructed, in principle, in the same way as or similar way to the functional components of said lighting unit with regards to lighting and possibly to the introduction of water/air, forced ventilation, clean-up and removal of any excess moisture in the grass by circulation of hot air etc.

What primarily distinguishes the present invention from the previous invention, which is the subject of Norwegian patent application 19991442, is the manner of displacement and the dimensioning of the lighting unit, which brings it up to a different order of magnitude from that of the previously developed, low carriage.

A system of the type indicated in the introductory part of the claim is distinguished by those features which appear in the claims.

The method that is also based on the use of a lighting unit that is moveable relative to the grass pitch, and which unit may, in addition to light sources for introduction of artificial lighting, be equipped with other functional devices such as mentioned previously, is characterized by the features stated in the claims.

The above-defined object is thus realized partly by a system and partly by a method in accordance with the present invention. The lighting unit, with auxiliary functions if so required, is thereby designed and dimensioned in a manner corresponding to the shape and dimensions of the relevant grass pitch, assuming the use of one rectangular, disc-shaped, long and wide box-shaped housing with a horizontal orientation, downwardly directed lighting and a predominantly vertical direction of travel, and positioned essentially directly opposite the grass pitch, so that the periphery of the vertical projection of the lighting unit in the raised, inoperative ready position of the unit broadly corresponds to the sidelines of the underlying grass pitch.

By such a lighting installation and method of lighting, the whole grass pitch will be lit at the same time, making it easier to ensure sufficient lighting within a certain time limit than when using a lighting unit that is to travel stepwise in the longitudinal direction of the grass pitch and periodically light sections that amount to a fraction of the area of the pitch.

A lighting installation according to the present invention will require a greater investment than the previous solution, however the operating costs will be reduced and the result of the lighting will improve considerably, and as a considerably larger pitch area is lit/treated within a given, limited time frame, the solution according to the invention is more easily adapted to implementation over shorter periods in which the pitch is not in use, precisely because the lighting time for the grass pitch as a whole according to the present invention is significantly shorter than the lighting time required by the previous lighting installation in order to light the entire pitch to an equivalent degree, i.e. with the same light intensity per unit area spread over a plurality of light sources.

In a practical embodiment, the entire lighting unit is designed to be lifted/lowered by means of wires attached to the lighting unit, which wires lead to powered winches and/or hydraulic jacks through guiding tackles arranged at the top of tubular masts or on protruding structures (stand roofs). The wires are attached to the lighting unit, preforably to its upward facing, closed surface, in such a manner as to allow it to be raised/lowered essentially in the horizontal position by coordinating said winches/jacks.

BRIEF DESCRIPTION OF THE DRAWING

An example of a schematically represented embodiment of a lighting installation, possibly equipped with devices for auxiliary functions such as watering, air circulation and other grass treatment, is described further in the following with reference to the accompanying drawings, in which:

FIG. 5 shows the lighting unit in the lowermost, active position (the lighting position), while FIG. 6 shows the lighting unit in a somewhat raised, intermediate position.

DETAILED DESCRIPTION OF THE INVENTION

Reference is first made to FIGS. 1–4 illustrating the first embodiment of the invention, in which embodiment the lighting unit hoisting arrangement is based on the use of masts 10 to the number of at least four masts, each placed outside but proximal to a corner of a rectangular sports pitch, e.g. in the form of a football pitch 12.

The football pitch 12 is surrounded by stands 14a, 14b, 14c on all four sides (the furthest stand has been removed in the interest of clarity).

Figure 4:
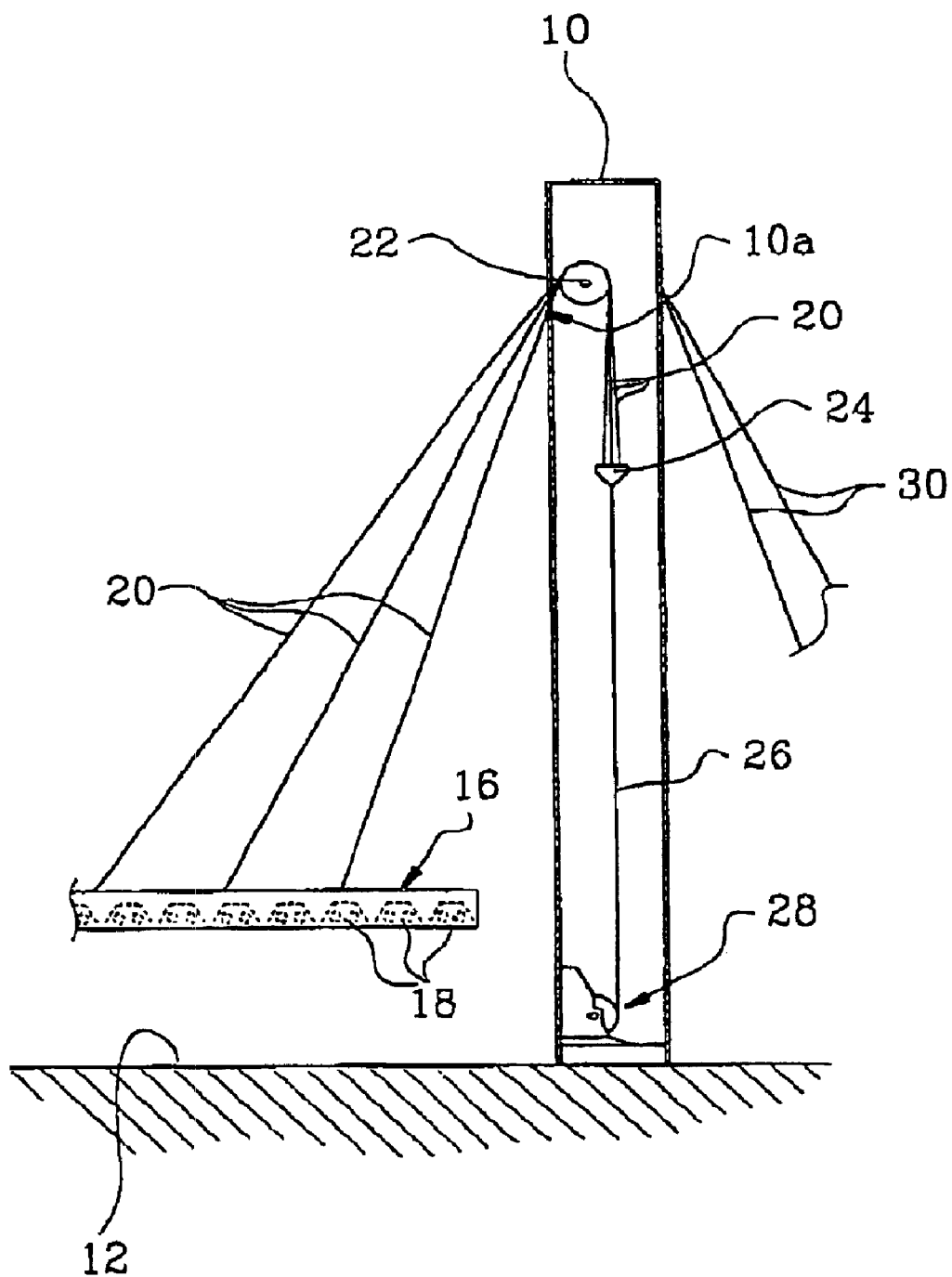
FIG. 4 is partial side view, partly shown as a vertical section, of a guyed, tubular upright mast that forms part of a plurality of at least four in the hoisting arrangement of the lighting unit, shown on a larger scale.

A flat, rectangular, disc-shaped lighting unit 16 is equipped with a plurality of light sources 18, FIG. 4.

The lighting unit 16 has a length and a width that essentially correspond to the rectangular area defined by the sidelines and goal lines of the football pitch, i.e. in practice the entire grass-covered area of the football pitch.

In principle, the lighting unit 16 is constructed so as to have a design and construction equal to that which appears from the above-mentioned Norwegian patent application no. 19991442, and may in addition to the appropriate fluorescent lamps and any incandescent bulbs mounted in downward facing guards distributed in longitudinal and transverse rows, comprise downwardly directed jets/nozzles for added water/compressed air, so that grass pitches that have received to little/much natural moisture in the form of rain may be brought up/down to a desired level of moisture for the uppermost layer of turf.

Figure 1:
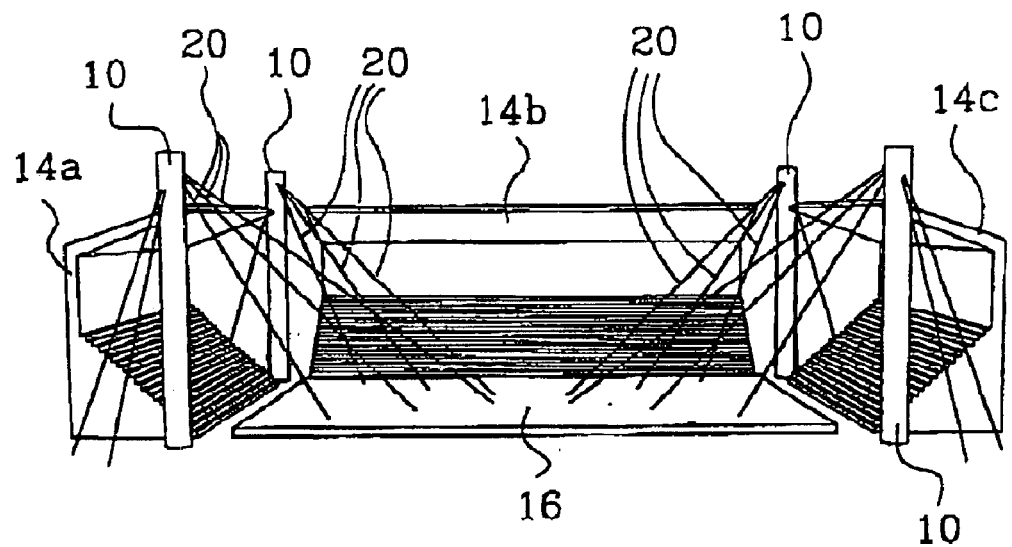
FIG. 1 shows a perspective view of a fully covering, flat disc-like lighting unit according to the invention in association with a football pitch with high stands but little in the way of a superstructure/stand roof, and with the lighting unit in the active lighting position.
Figure 2:
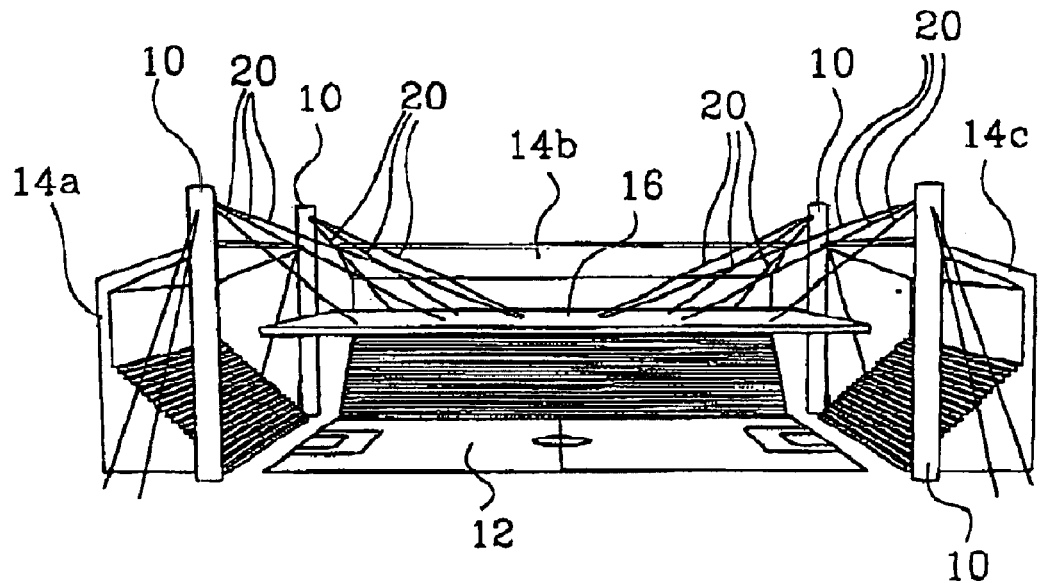
FIG. 2 is similar to FIG. 1, but shows the lighting unit in a raised, inactive intermediate position.
Figure 3:
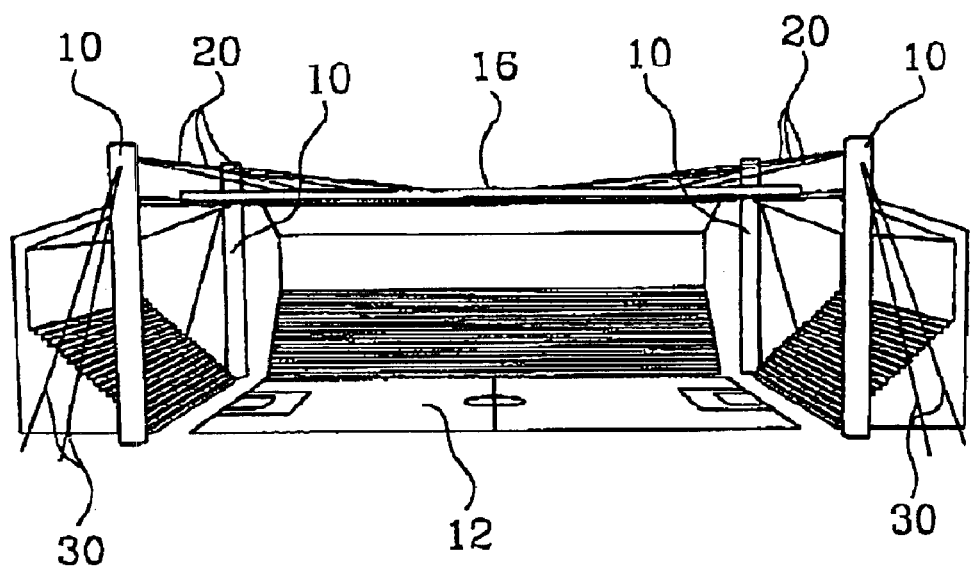
FIG. 3 is similar to FIG. 2, but shows the lighting unit in a position in which it is raised further, which position may be its upper extreme position.

In accordance with the present invention, the lighting unit 16 is moved vertically between a lower, active lighting position, FIG. 1, in which the grass pitch is lit and possibly watered/aired etc., and an upper, inactive ready position, FIG. 3, FIG. 2 showing an intermediate position.

Figure 5:
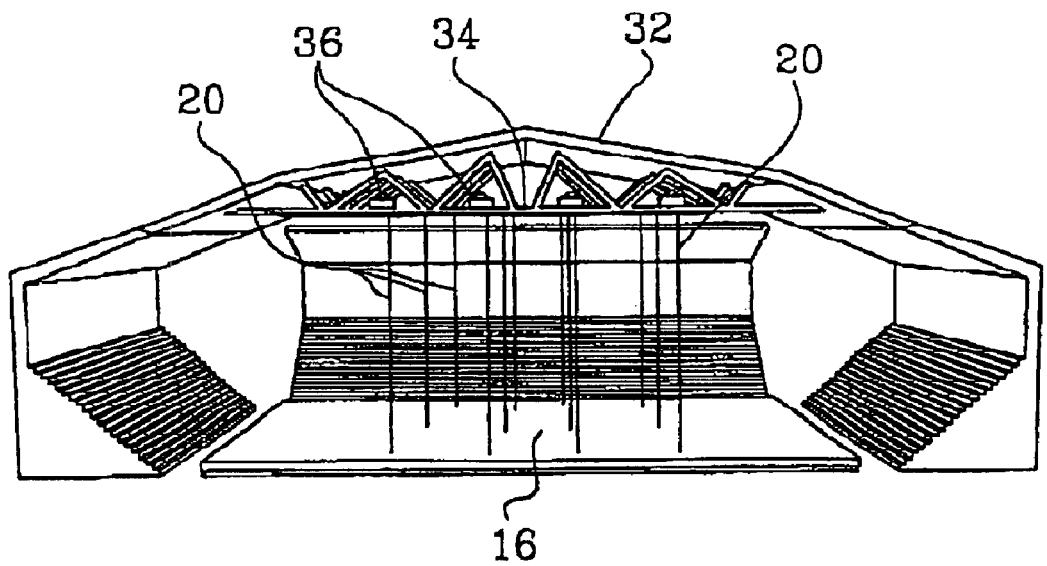
FIGS. 5 and 6 show the system according to the invention adapted to a covered football pitch, where the stand and roof constructions allow a different embodiment of the lighting unit hoisting arrangement, where
Figure 6:
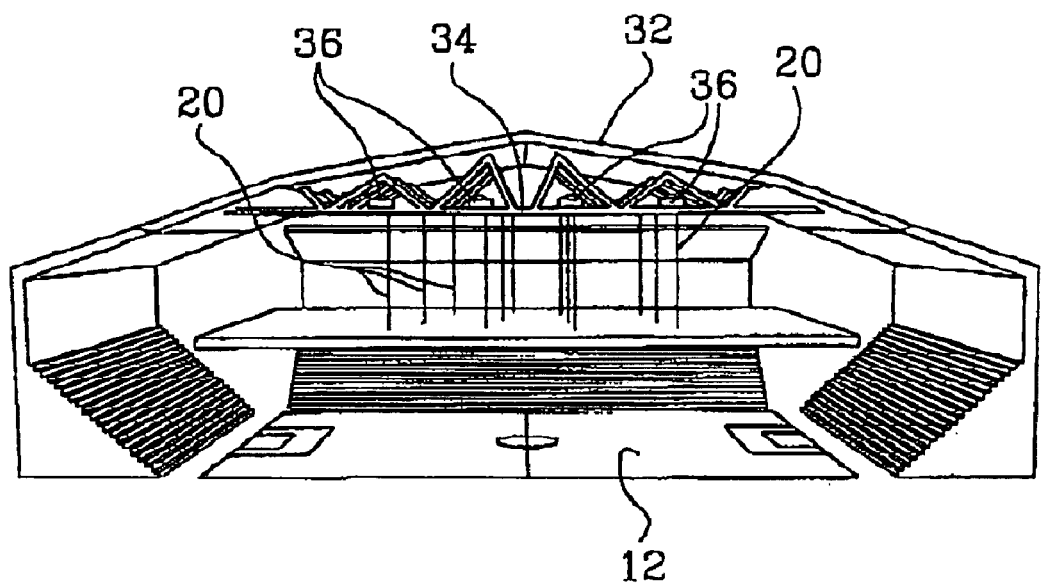

Thus the construction of the system/arrangement according to the invention is based on a hoisting arrangement, a first embodiment of which is shown in FIGS. 1–4 and a second embodiment of which is shown in FIGS. 5 and 6.

Both embodiments make use of very long, rope-like flexible power/motion transferring elements in the form of steel ropes/wires 20, which in both embodiments are attached by one end to the top of the lighting unit 16.

Inside each upright tubular/hollow mast 10, an opening 10a is formed near the top of the wall of the tubular mast for leadthrough of, in this embodiment three, wires 20 that inside the tubular mast 10 control a rotatable tackle 22, the three wires 20 being attached to a common holder 24 that also acts as a stopping device upon complete pull-out of the wires from the tubular mast 10. The holder 24 is too large to be pulled through the leadthrough opening 10a for the wires 20 in the wall of the tubular mast 10.

The holder 24 is connected to a single wire 26 leading to a hoisting apparatus/winch 28.

Each mast 10 is guyed, with 30 denoting guys.

The hoisting apparatus 28 is co-ordinated and synchronized, and also adjusted and adapted for lifting/lowering of the rectangular, disc-shaped lighting unit 16 in a horizontal orientation between the two extreme positions of the unit, FIGS. 1 and 3.

In the embodiment shown in FIGS. 5 and 6, use is made of a stand roof 32 by a wholly or partly covered stand, under which roof is installed an intermediate roof 34 for mounting of the winches 28 that form part of the hoisting arrangement of the lighting unit 16. Among other things, the stand roof 32 and the intermediate roof 34 result in a simplification of the wire pulling, as the individual wires 20 may here run a straight course. Naturally, guyed masts are superfluous in this latter embodiment of the hoisting arrangement, FIGS. 5 and 6.

Reference number 36 denotes a powered hoisting apparatus. The hoisting apparatus may if desired be made up of hydraulic is jacks.

What is claimed is:

1. A system for making the growth conditions for plants more favorable, said plants forming part of a grass pitch, said system comprising:

a traveling lighting unit having at least one light source and having a periphery that is dimensioned so as to essentially correspond to the grass pitch and capable of traveling in the heightwise direction relative to the grass pitch between a lower, active position in which the grass pitch is lit and an upper inactive position, and a hoisting apparatus connected to the lighting unit to control the travel of the traveling lighting unit, wherein the hoisting apparatus is capable of winding and unwinding at least one of a plurality of wires that leads from the hoisting apparatus to at least one attachment point on the traveling lighting unit;

wherein the grass pitch further comprises covered stadium stands and said hoisting apparatus is mounted on a roof construction of the covered stadium stands, and wherein the at least one of the plurality of wires runs a vertical course between the hoisting apparatus and the attachment point on the traveling lighting unit.

2. A system for making the growth conditions for plants more favorable, said plants forming part of a grass pitch, said system comprising:

a traveling lighting unit having at least one light source and having a periphery that is dimensioned so as to essentially correspond to the grass pitch and capable of traveling in the heightwise direction relative to the grass pitch between a lower, active position in which the grass pitch is lit and an upper inactive position; and a hoisting apparatus connected to the lighting unit to control the travel of the traveling lighting unit, wherein the hoisting apparatus is capable of winding and unwinding at least one of a plurality of wires that leads from the hoisting apparatus to at least one attachment point on the traveling lighting unit;

further comprising at least four hollow masts, the upper end of each of the masts having a leadthrough opening through which one or more of the plurality of the wires, is coupled to a holder disposed internally of the respective mast.

3. The system according to claim 2, wherein at least one of the plurality of wires extends from the holder to the hoisting apparatus, the hoisting apparatus being located at the lower end of the respective mast.

4. The system according to claim 2, wherein the at least four masts are guyed.

5. The system according to claim 2, wherein the plurality of wires are connected to the holder.

6. The system according to claim 2, wherein the traveling lighting unit further comprises means for supplying water to the grass pitch.

7. The system according to claim 2, wherein the traveling lighting unit further comprises means for supplying air to the grass pitch.

* * * * *